United States Patent

[11] 3,552,303

[72] Inventor Douglas R. Parrish
 314 W. 58th St., Los Angeles, Calif. 90037
[21] Appl. No. 746,686
[22] Filed July 22, 1968
[45] Patented Jan. 5, 1971

[54] CAKE PAN ASSEMBLY
 2 Claims, 5 Drawing Figs.
[52] U.S. Cl. .................................................. 99/447
[51] Int. Cl. .................................................. A47j 37/01
[50] Field of Search ...................................... 99/447,
 346, 426—428, 430—433, 439—442, 281, 389,
 401, 406; 126/275, 273, 376; 220/69, 70

[56] References Cited
 UNITED STATES PATENTS
| 3,314,358 | 4/1967 | Burns | 99/447 |
| 854,394 | 5/1907 | Allender | 99/439X |
| 1,294,528 | 2/1919 | Olsen | 99/447 |
| 2,171,919 | 9/1939 | Dodge | 220/69 |
| 2,233,064 | 2/1941 | Stutzner | 99/433X |
| 2,312,555 | 3/1943 | Jepson | 99/281 |
| 2,360,062 | 10/1944 | Lannen | (99/447)UX |
| 2,592,692 | 4/1952 | Hattenbach | 220/69 |

FOREIGN PATENTS
| 18,356 | 8/1909 | Great Britain | 99/428 |
| 229,463 | 8/1909 | Great Britain | 99/428 |
| 12,835 | 12/1909 | Great Britain | 99/447 |

Primary Examiner—Walter A. Scheel
Assistant Examiner—Arthur O. Henderson
Attorney—Jessup and Beecher ABSTRACT: A cake pan assembly is provided which is particularly suited for baking cakes of a particular shape. The cake pan assembly of the invention provides a convenient means for baking cakes which have a shape basically approximating a paraboloid. Such cakes are used as the bases for the ultimate design of a doll cake, or of a design having other configurations based on the paraboloid shape. The improved cake pan assembly also includes a removable elongated heat conductive member to assure that the cake will be baked uniformly throughout, and it has a base for supporting the paraboloid pan in an upright position.

PATENTED JAN 5 1971
3,552,303
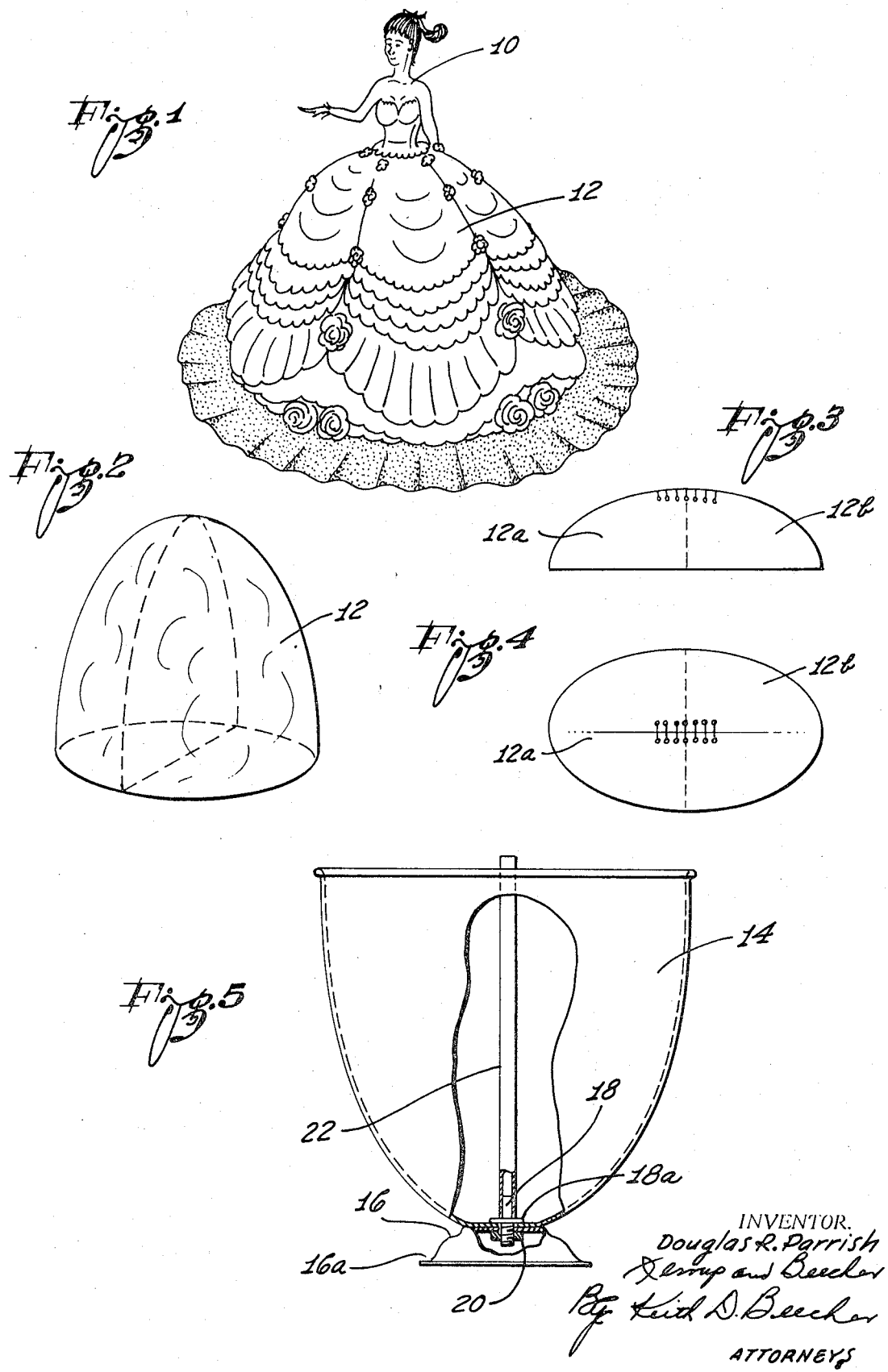
INVENTOR.
Douglas R. Parrish
Jenny and Beecher
By Keith D. Beecher
ATTORNEYS

CAKE PAN ASSEMBLY

BACKGROUND OF THE INVENTION

Fancy cakes for special occasions are extremely popular at the present time. For example, such cakes take on a variety of shapes, and have a variety of icing designs. One very popular cake, for example, is the "doll" cake, in which the cake itself forms the full hoop skirt of the doll.

The improved pan assembly of the present invention permits such a cake to be baked directly, instead of by the usual prior art methods of using a stack composed of layer cakes and torte cakes, which are wastefully shaped into the desired configuration. It will also become evident as the description proceeds that the improved cake pan assembly of the invention enables cakes to be baked directly which may assume a variety of ultimate motifs, such as doll cakes, beehives cakes, space capsule cakes, igloo cakes, champagne cakes, bassinette cakes, boat cakes, Indian tepee cakes, and so on, all based on a shape approximating the solid parabolic configuration.

A principal object of the invention, therefore, is to provide an improved cake pan assembly which is capable of baking directly a cake of a solid parabolic shape, or the like, so as to enable a variety of different cake designs to be realized easily and simply and without the need for using multiple cakes or for detailed and cake wasting shaping operations. The cake pan of the invention enables the desired cake to be baked directly, and economically, and without the need for any special skill.

BRIEF DESCRIPTION OF THE DRAWINGS

FIG. 1 shows a finished doll cake which may be made easily and conveniently by using the improved cake pan assembly of the invention;

FIG. 2 illustrates the basic cake which is used in the finished doll cake of FIG. 1, and in other designs;

FIGS. 3 and 4 are elevation and plan views, respectively, showing how the basic cake of FIG. 2 may be cut for certain designs, other than the doll cake; and FIG. 5 is a view, partly broken away, of a cake pan embodying the concepts of the present invention.

DETAILED DESCRIPTION OF THE ILLUSTRATED EMBODIMENT

The doll cake shown in FIG. 1 includes, for example, a doll 10 which is inserted into the top of a cake 12. The cake 12 is shaped to simulate a hooped skirt for the doll, and is iced appropriately to represent the finished design.

As shown in FIG. 2, the basic shape of the cake 12 is generally that of a solid parabola. As described above, such a shape was achieved in the prior art by using layer cakes and other types of cakes stacked on one another, and then by a wasteful shaping operation. The shaping operation, moreover, required a certain amount of skill in order to achieve the desired effect in the finished design.

Still other shapes may be derived by cutting the cake along the dotted line in FIG. 2, and then by placing the two parts together, as shown in FIGS. 3 and 4. The latter cake may be used, for example, to simulate a football (as shown), an Easter Egg, or the like.

The cake pan of the assembly is capable of providing the cake 12 of FIG. 2 by means of a simple baking operation. It will be appreciated that various sized cakes may be made by the cake pan, merely by filling the cake pan to different levels, depending upon the size of the cake desired.

The cake pan of the invention, as shown in FIG. 5 includes an outer shell 14. The outer shell has a side which extends up from the bottom and flares out with a generally parabolic shape from the bottom, and the upper edge of the side of the pan defines a generally circular open top for the pan.

The bottom of the pan 14 has a hole formed in it, and a disc-shaped base 16 is supported externally of the bottom of the pan, by means, for example, of a stud 18 which extends through the hole. The stud 18 has a shoulder 18a which engages the bottom of the pan 14, and it has a threaded portion which extends through the hole in the bottom and through a corresponding hole in the center of the disc-shaped base 16. A nut 20 is threaded onto the lower end of the stud 18 to hold the stud in place in the pan 14, and also to hold the base 16 in place on the bottom of the pan.

An elongated member 22 is supported by the stud 18, and at least the lower portion of the elongated member 22 may be hollow to be received by the stud in a telescopic relationship therewith, as shown. The elongated member 22 extends along the longitudinal axis of the pan 14. The pan 14, the base 16, and the elongated member 22, are composed of a suitable heat conductive material, such as polished aluminum. The elongated member serves to conduct heat to the center of the cake, assuring that the cake will be baked uniformly throughout, when the assembly of the invention is used. The elongated member 22, as well as the threaded stud 18 and the base 16 are all demountable, for easy cleaning of the assembly. An aperture 16a may be provided in the base 16 for hanging up the assembly when not in use.

It will be appreciated that when a cake is to be baked in the assembly of FIG. 5, the interior of the pan 14 is first greased with shortening or butter, and a coating of flour is then applied. The cake batter is then poured into the pan, and the pan is filled to a desired level with the batter, depending upon the size of the cake required. After the cake has been baked, the pan is turned upside down on wax paper and permitted to cool. Then the pan is carefully removed from the cake. The cake may then be iced as desired and in the form shown in FIG. 1, for example, and other appropriate decorations, such as the doll of FIG. 1 may be inserted.

The invention provides, therefore, an improved baking pan assembly which permits a cake of a particular shape to be baked directly, so as to obviate any need for multiple cakes, or wasteful shaping operations.

It will be appreciated that while a particular embodiment of the invention has been shown and described, modifications may be made. It is intended in the following claims to cover all modifications which come within the scope of the invention.

I claim:

1. A cake pan assembly for baking a cake having a configuration approximately a paraboloid, said assembly including: a hollow body portion having an outwardly flared side with a generally parabolic shape and extending up from the bottom of said body portion and defining an open top therefor; an inverted dish-shaped base member affixed to said bottom of said body portion and having a disc-shaped rim adapted to rest on a horizontal supporting surface for supporting said body portion in a generally upright position; a removable elongated member of heat conductive material extending upwardly in said body portion from the bottom thereof; a stud extending through said bottom of said body portion and through said base to receive the lower end of said elongated member in coaxial sliding telescopic relationship therewith, said studs serving removably to support said elongated member in said body portion; and nut means threaded to said stud to support said base on said bottom of said body portion.

2. The cake pan assembly defined in claim 1, in which said body portion and said elongated member are formed of polished aluminum.

Disclaimer and Dedication 3,552,303.—*Douglas R. Parrish*, Los Angeles, Calif. CAKE PAN ASSEMBLY. Patent dated Jan. 5, 1971. Disclaimer and Dedication filed Mar. 17, 1986, by the assignee, *The Pillsbury Co.*

Hereby disclaims and dedicates said patent to the Public.
[*Official Gazette July 8, 1986.*]